US012707217B2

(12) United States Patent
Kim et al.

(10) Patent No.: US 12,707,217 B2
(45) Date of Patent: Aug. 11, 2026

(54) TRANSMISSION DEVICE, RECEPTION DEVICE, AND CONTROL METHOD THEREOF

(71) Applicant: Samsung Electronics Co., Ltd., Suwon-si (KR)

(72) Inventors: Hanki Kim, Suwon-si (KR); Jongwoo Kim, Suwon-si (KR); Haekwang Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 18/638,261

(22) Filed: Apr. 17, 2024

(65) Prior Publication Data

US 2024/0267689 A1 Aug. 8, 2024

Related U.S. Application Data

(63) Continuation of application No. PCT/KR2022/016980, filed on Nov. 2, 2022.

(30) Foreign Application Priority Data

Dec. 22, 2021 (KR) ........................ 10-2021-0185484

(51) Int. Cl.
*H04S 3/00* (2006.01)
*G06F 3/16* (2006.01)
(Continued)

(52) U.S. Cl.
CPC .............. *H04S 3/008* (2013.01); *G06F 3/162* (2013.01); *H04R 5/02* (2013.01); *H04R 5/04* (2013.01);
(Continued)

(58) Field of Classification Search
CPC .. H04S 3/008; H04S 2400/01; H04S 2400/03; H04R 5/02; H04R 5/04; H04R 2420/07; G06F 3/162
See application file for complete search history.

(56) References Cited

U.S. PATENT DOCUMENTS 7,945,054 B2 5/2011 Kim
8,705,779 B2 4/2014 Lee
(Continued)

FOREIGN PATENT DOCUMENTS

JP 4255031 B2 2/2009
KR 100307622 B1 10/2001
(Continued)

OTHER PUBLICATIONS

International Search Report for PCT/KR2022/016980 mailed Feb. 20, 2023, 3 pages.
(Continued)

*Primary Examiner* — Paul W Huber
(74) *Attorney, Agent, or Firm* — Nixon & Vanderhye P.C.

(57) ABSTRACT

Disclosed are a transmission device, a reception device, and a control method. The transmission device comprises: a communication interface comprising circuitry and at least one processor, comprising processing circuitry, wherein at least one processor, individually and/or collectively, is configured to: from among audio signals of a plurality of channels including a left channel, a sub-left channel, a right channel, a sub-right channel, and a woofer channel, separates the audio signals of the sub-left channel and the sub-right channel into a high-pass audio signal and a low-pass audio signal, respectively, on the basis of a frequency band; mixes the high-pass audio signal of the sub-left channel and the high-pass audio signal of the sub-right channel with the audio signal of the woofer channel; mixes the low-pass audio signal of the sub-left channel with the
(Continued)

audio signal of the left channel; mixes the low-pass audio signal of the sub-right channel with the audio signal of the right channel; and control the communication interface to transmit the audio signals of the mixed woofer channel, the mixed left channel, and the mixed right channel to the reception device.

10 Claims, 10 Drawing Sheets

(51) Int. Cl.
*H04R 5/02* (2006.01)
*H04R 5/04* (2006.01)

(52) U.S. Cl.
CPC ...... *H04R 2420/07* (2013.01); *H04S 2400/01* (2013.01); *H04S 2400/03* (2013.01)

(56) References Cited

U.S. PATENT DOCUMENTS 8,874,449 B2 10/2014 Lee
9,668,081 B1 * 5/2017 Chen ........................ H04S 7/307
10,250,968 B2 4/2019 Eichfeld
2006/0280311 A1 12/2006 Beckinger
2008/0187156 A1 * 8/2008 Yokota .................... H04R 1/025 381/307
2017/0078824 A1 3/2017 Heo
2017/0208411 A1 7/2017 Seldess
2025/0126426 A1 * 4/2025 Kyriakakis ......... G10L 21/0232

FOREIGN PATENT DOCUMENTS

KR 20030092351 A 12/2003
KR 100590229 B1 6/2006
KR 100619082 B1 9/2006
KR 20100077424 A 7/2010
KR 101454342 B1 10/2014
KR 101659626 B1 9/2016
KR 20170031392 A 3/2017
KR 101756838 B1 7/2017

OTHER PUBLICATIONS

Written Opinion of the ISA for PCT/KR2022/016980 mailed Feb. 20, 2023, 4 pages.

* cited by examiner

FIG. 7

TRANSMISSION DEVICE, RECEPTION DEVICE, AND CONTROL METHOD THEREOF

CROSS-REFERENCE TO RELATED APPLICATIONS

This application is a continuation of International Application No. PCT/KR2022/016980 designating the United States, filed on Nov. 2, 2022, in the Korean Intellectual Property Receiving Office and claiming priority to Korean Patent Application No. 10-2021-0185484, filed on Dec. 22, 2021, in the Korean Intellectual Property Office, the disclosures of each of which are incorporated by reference herein in their entireties.

BACKGROUND

Field

The disclosure relates to a transmission device, a reception device, and a control method thereof, and for example, to a transmission device that down-mixes channels of audio signals at the transmission device and transmits the signals to a reception device, and a control method thereof.

Description of Related Art

With the development of electronic technologies and communication technologies, various electronic apparatuses are being developed. For expressing stereophonic sounds of a content, a multi-channel speaker has been developed, and recently, a multi-channel speaker in a form of a sound bar has been commercialized.

A sound bar may include a speaker outputting audio signals of a woofer (or, a sub-woofer) channel, a front left channel, a rear left channel, a front right channel, and a rear right channel. A woofer speaker and a rear speaker included in a sound bar recently released may be connected wirelessly for the convenience of installation. Also, for outputting effective stereophonic sounds, a sound bar may include a speaker outputting audio signals of more channels, and channels of audio signals that are to be transmitted by a main body of a sound bar are increasing.

For increasing the number of wireless transmission channels, a sound bar may include a wireless module having high performance or include more wireless modules. However, in case a lot of wireless modules are included in a sound bar, a problem such as channel interference may be generated, and there is also a problem that the cost of a sound bar increases.

Accordingly, there is a need for a technology that enables effective wireless transmission of multi-channel audio signals without changing wireless modules included in a sound bar.

SUMMARY

The disclosure addresses the aforementioned problems, and the embodiments of the disclosure may provide a transmission device that minimizes and/or reduces deformation or loss of multi-channel audio signals transmitted wirelessly, a reception device, and a control method thereof.

A transmission device according to an example embodiment of the disclosure includes: a communication interface comprising circuitry and at least one processor, comprising processing circuitry, wherein at least one processor, individually and/or collectively, is configured to: among audio signals of a plurality of channels including a left channel, a sub-left channel, a right channel, a sub-right channel, and a woofer channel, separate the audio signals of the sub-left channel and the sub-right channel respectively into a high-pass audio signal and a low-pass audio signal based on a frequency band, mix the high-pass audio signal of the sub-left channel and the high-pass audio signal of the sub-right channel with the audio signal of the woofer channel, mix the low-pass audio signal of the sub-left channel with the audio signal of the left channel, and mix the low-pass audio signal of the sub-right channel with the audio signal of the right channel, and control the communication interface to transmit the audio signals of the mixed woofer channel, the mixed left channel, and the mixed right channel to the reception device.

A reception device according to an example embodiment of the disclosure includes: a communication interface comprising circuitry, a speaker configured to output audio signals of a plurality of channels, and at least one processor, comprising processing circuitry, wherein at least one processor, individually and/or collectively, is configured to: control the communication interface to receive audio signals of a mixed woofer channel, a mixed left channel, and a mixed right channel, wherein the audio signal of the mixed woofer channel includes a high-pass audio signal of a sub-left channel, a high-pass audio signal of a sub-right channel, and an audio signal of a woofer channel, and the audio signal of the mixed left channel includes a low-pass audio signal of the sub-left channel and an audio signal of a left channel, and the audio signal of the mixed right channel includes a low-pass audio signal of the sub-right channel and an audio signal of a right channel, and separate the high-pass audio signal of the sub-left channel, the high-pass audio signal of the sub-right channel, and the audio signal of the woofer channel from the audio signal of the mixed woofer channel, and control the speaker to output the separated audio signal of the woofer channel, the separated high-pass audio signal of the sub-left channel, the audio signal of the mixed left channel, the separated audio signal of the sub-right channel, and the audio signal of the mixed right channel respectively to the corresponding channels of the speaker.

A method of controlling a transmission device according to an example embodiment of the disclosure includes: among audio signals of a plurality of channels including a left channel, a sub-left channel, a right channel, a sub-right channel, and a woofer channel, separating the audio signals of the sub-left channel and the sub-right channel respectively into a high-pass audio signal and a low-pass audio signal based on a frequency band, mixing the high-pass audio signal of the sub-left channel and the high-pass audio signal of the sub-right channel with the audio signal of the woofer channel, mixing the low-pass audio signal of the sub-left channel with the audio signal of the left channel, and mixing the low-pass audio signal of the sub-right channel with the audio signal of the right channel, and transmitting the audio signals of the mixed woofer channel, the mixed left channel, and the mixed right channel to the reception device.

A method of controlling a reception device including a speaker configured to output audio signals of a plurality of channels according to an example embodiment of the disclosure includes: receiving audio signals of a mixed woofer channel, a mixed left channel, and a mixed right channel, wherein the audio signal of the mixed woofer channel includes a high-pass audio signal of a sub-left channel, a high-pass audio signal of a sub-right channel, and an audio signal of a woofer channel, and the audio signal of the mixed left channel includes a low-pass audio signal of the sub-left channel and an audio signal of a left channel, and the audio signal of the mixed right channel includes a low-pass audio signal of the sub-right channel and an audio signal of a right channel, and separating the high-pass audio signal of the sub-left channel, the high-pass audio signal of the sub-right channel, and the audio signal of the woofer channel from the audio signal of the mixed woofer channel, and outputting the separated audio signal of the woofer channel, the separated high-pass audio signal of the sub-left channel, the audio signal of the mixed left channel, the separated audio signal of the sub-right channel, and the audio signal of the mixed right channel respectively to the corresponding channels of the speaker.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a block diagram illustrating an example configuration of a transmission device according to various embodiments;

DETAILED DESCRIPTION

Figure 1:
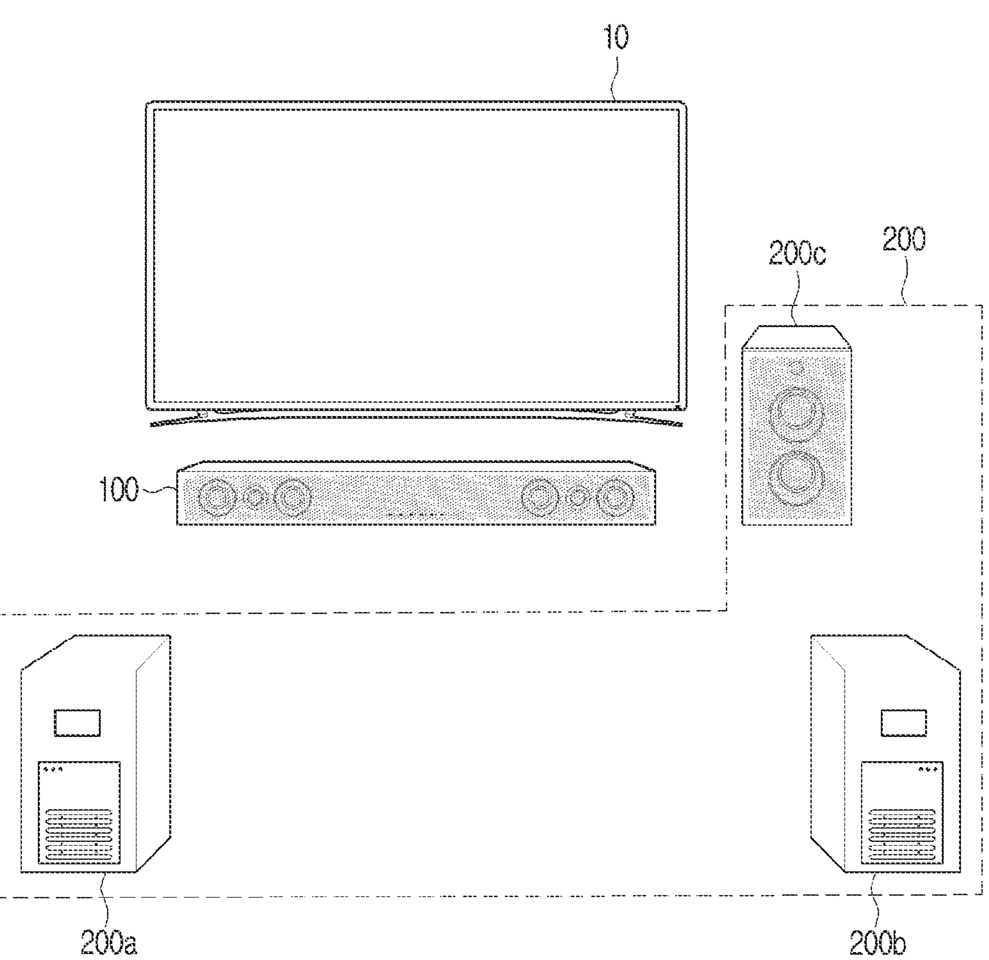
FIG. 1 is a diagram illustrating an example audio system according to various embodiments.

Hereinafter, various example embodiments will be described in greater detail with reference to the accompanying drawings. The various example embodiments described in this disclosure may be modified in various forms. Various embodiments may be illustrated in the drawings, and explained in detail in the detailed description. However, the embodiments disclosed in the accompanying drawings are simply for making the various embodiments understood easily. Accordingly, the technical idea of the disclosure is not limited by the specific embodiments disclosed in the accompanying drawings, but they should be interpreted to include all equivalents or alternatives included in the ideas and the technical scopes of the disclosure.

Terms including ordinal numbers such as 'the first' and 'the second' may be used to describe various components, but these components are not limited by the aforementioned terms. The aforementioned terms are used only for the purpose of distinguishing one component from another component.

In addition, in this disclosure, terms such as "include" and "have" should be understood as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof. The description that one element is "coupled" or "connected" to another element should be understood to refer, for example, to the one element being directly coupled or connected to the another element, or still another element may exist between the elements. A description that one element is "directly coupled" or "directly connected" to another element should be understood to refer, for example, to still another element not existing between the one element and the another element.

Meanwhile, "a module" or "a part" for the elements used in this disclosure performs at least one function or operation. Also, "a module" or "a part" may perform a function or an operation by hardware, software, or a combination of hardware and software. A plurality of "modules" or a plurality of "parts" except "a module" or "a part" that needs to be implemented in specific hardware or is performed in at least one processor that may be integrated into at least one module. Further, singular expressions include plural expressions, unless defined differently in context.

In the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this disclosure may include not only a case wherein one of A or B is selectively referred to, but also a case wherein both of A and B are included. In addition, the term "include" in this disclosure may include a case wherein elements other than elements listed as being included are further included.

In this disclosure, elements necessary for describing the disclosure are described, and elements not related to the essence of the disclosure may not be mentioned. The descriptions of the disclosure should not be interpreted to have an exclusive meaning of including only the elements mentioned, but to have a non-exclusive meaning of also including other elements.

In describing the disclosure, in case it is determined that detailed explanation of related known functions or features may unnecessarily confuse the gist of the disclosure, the detailed explanation may be abridged or omitted. Meanwhile, each embodiment of the disclosure may be independently implemented or operated, but it may also be implemented or operated in combination with another embodiment or feature of another embodiment.

FIG. 1 is a diagram illustrating an example audio system according to various embodiments.

Referring to FIG. 1, an audio system includes a transmission device 100 and a reception device 200. As an example, the transmission device 100 may be a main body of a sound bar, and the reception device 200 may be a speaker that is wirelessly connected with the main body of the sound bar, and outputs audio signals corresponding to each channel. The reception device 200 illustrated in FIG. 1 may include a rear left speaker 200*a*, a rear right speaker 200*b*, a woofer (or, a sub-woofer) speaker 200*c*. However, the reception device 200 illustrated in FIG. 1 is merely an example, and the reception device 200 may include various speakers that output audio signals of various channels, which are independent from the main body of the sound bar.

The audio system may be connected with the display device 10 via wire or wirelessly. When the display device 10 outputs an image signal through a display, the display device 10 may transmit an audio signal to the transmission device 100. An audio signal may include multi-channel signals. As an example, in case an audio signal is a 4.1 channel, the audio signal may include a front left channel, a rear left channel, a front right channel, a rear right channel, and a woofer channel. As illustrated in FIG. 1, the transmission device 100 may include a speaker outputting audio signals of the front left channel and the front right channel, and a speaker outputting audio signals of the rear left channel, the rear right channel, and the woofer channel may be implemented as a separate reception device 200 from the transmission device 100. The transmission device 100 and the reception device 200 may be connected by a wired or wireless method. The transmission device 100 may transmit audio signals of channels corresponding to the speakers included in the reception device 200 to each channel of the reception device 200. For example, the transmission device 100 may transmit audio signals of the rear left channel, the rear right channel, and the woofer channel respectively to a rear left speaker 200*a*, a rear right speaker 200*b*, and a woofer speaker 200*c*. That is, the transmission device 100 may transmit audio signals of three channels (the rear left channel, the rear right channel, the woofer channel) to the reception device 200 through transmission channels of three channels. Each speaker of the reception device 200 may output the audio signals of the channels received from the transmission device 100.

Meanwhile, the front channel and the rear channel may include more channels. For example, the front channel may include a main front channel and a sub-front channel, and the rear channel may include a main rear channel and a sub-rear channel. Also, as described above, the front/rear channels may respectively include left channels and right channels. That is, the rear channel may include a main rear left channel, a sub-rear left channel, a main rear right channel, and a sub-rear right channel. As an example, the main rear left channel may be implemented as the main left channel, the sub-rear left channel may be implemented as the rear top left channel, the main rear right channel may be implemented as the main right channel, and the sub-rear right channel may be implemented as the rear top right channel. If the rear channel includes the main rear left channel, the sub-rear left channel, the main rear right channel, and the sub-rear right channel, the transmission device 100 needs to transmit audio signals of all five channels including the woofer channel to the reception device 200. In case the wireless transmission channel can transmit five channels at the same time, the transmission device 100 may transmit audio signals of each channel to the reception device 200 through each channel of the wireless transmission channel. However, in case the wireless transmission channel of the transmission device 100 can transmit only three channels or four channels at the same time, the transmission device 100 needs to down-mix audio signals of five channels to correspond to the number of the wireless transmission channels, and transmit the audio signals to the reception device 200. A detailed process of transmitting audio signals to the reception device 200 by minimizing and/or reducing loss of the audio signals will be described later.

An example of a speaker outputting audio signals of the main rear channel and the sub-rear channel will be described in greater detail below.

Figure 2:
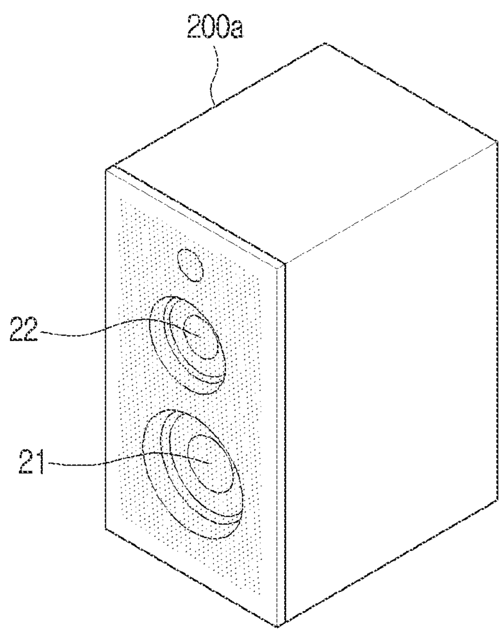
FIG. 2 is a perspective view illustrating an example speaker according to various embodiments.

FIG. 2 is a perspective view illustrating an example speaker according to various embodiments.

Referring to FIG. 2, a rear left speaker 200*a* is illustrated. The rear left speaker 200*a* may include a main speaker 21 outputting audio signals of the main rear left channel. The rear left speaker 200*a* may include the main speaker 21 and a sub speaker 22 outputting audio signals of the rear top left channel which is the sub-rear left channel together.

FIG. 2 illustrates the rear left speaker 200*a* as an example, but the rear right speaker may also be implemented in the same method as the rear left speaker 200*a*. Also, the front left speaker and the front right speaker may be implemented in the same or substantially the same method.

From below, the configurations of the transmission device and the reception device will be described in greater detail.

Figure 3:
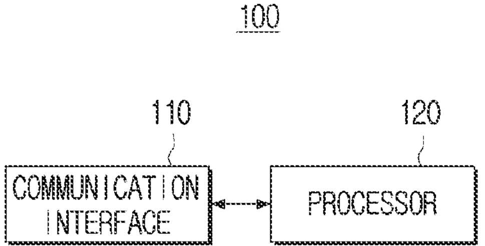
FIG. 3 is a block diagram illustrating an example configuration of a transmission device according to various embodiments.

FIG. 3 is a block diagram illustrating an example configuration of a transmission device according to various embodiments.

Referring to FIG. 3, the transmission device 100 may include a communication interface (e.g., including various circuitry) 110 and a processor (e.g., including processing circuitry) 120.

The communication interface 110 may include various circuitry and perform communication with an external device. The communication interface 110 may transmit an audio signal to the external device using a wired/wireless communication method. For example, the communication interface 110 may include, for example, and without limitation, a module (e.g., including various communication circuitry) that can perform communication by methods such as 3G, Long Term Evolution (LTE), 5G, Wi-Fi, Bluetooth, Digital Multimedia Broadcasting (DMB), Advanced Television Systems Committee (ATSC), Digital Video Broadcasting (DVB), a Local Area Network (LAN), etc. The communication interface 110 performing communication with an external device may also be referred to as a communicator, a communication device, a communication module, a transceiver, etc.

The processor 120 may include various processing circuitry and control each component of the transmission device 100. The processor 120 may down-mix channels of an audio signal so that the audio signal can be transmitted through the wireless transmission channel. The processor 120 according to an embodiment of the disclosure may include various processing circuitry and/or multiple processors. For example, as used herein, including the claims, the term “processor” may include various processing circuitry, including at least one processor, wherein one or more of at least one processor, individually and/or collectively in a distributed manner, may be configured to perform various functions described herein. As used herein, when “a processor”, “at least one processor”, and “one or more processors” are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

For example, an audio signal may include a plurality of channels including a left channel, a sub-left channel, a right channel, a sub-right channel, and a woofer (or, a sub-woofer) channel. For example, an audio signal may be a signal of five channels. However, the wireless transmission channels may be fewer than five channels. For example, the number of the wireless transmission channels may be three channels or four channels. In this case, the transmission device 100 cannot transmit the audio signal through the respective wireless transmission channels. Accordingly, the processor 120 should down-mix the channels of the audio signal so that the audio signal can be transmitted through the wireless transmission channels.

The processor 120 may separate audio signals of the sub-left channel and the sub-right channel among audio signals of the plurality of channels. The processor 120 may separate the audio signals of the sub-left channel and the sub-right channel respectively into a high-pass audio signal and a low-pass audio signal based on a frequency band. For example, the processor 120 may separate the audio signals of the sub-left channel and the sub-right channel based on a predetermined frequency higher than a cut-off frequency of the woofer channel. As an example, the predetermined frequency may be a stop band boundary frequency of the woofer channel.

The processor 120 may mix the high-pass audio signal of the sub-left channel and the high-pass audio signal of the sub-right channel that were separated with the audio signal of the woofer channel. As an example, the processor 120 may generate an audio signal of a first woofer channel wherein the high-pass audio signals of the woofer channel and the sub-left channel are mixed, and generate an audio signal of a second woofer channel wherein the high-pass audio signals of the woofer channel and the sub-right channel are mixed. Then, the processor 120 may mix the low-pass audio signal of the sub-left channel with the audio signal of the left channel, and mix the low-pass audio signal of the sub-right channel with the audio signal of the right channel. Accordingly, the processor 120 may down-mix from audio signals of five channels including the left channel, the sub-left channel, the right channel, the sub-right channel, and the woofer channel to audio signals of three channels including the mixed woofer channel, the mixed left channel, and the mixed right channel. Alternatively, the processor 120 may down-mix to audio signals of four channels including the mixed first woofer channel, the mixed second woofer channel, the mixed left channel, and the mixed right channel.

The processor 120 may control the communication interface 110 to transmit audio signals of the mixed woofer channel, the mixed left channel, and the mixed right channel to the reception device. For example, the processor 120 may control the communication interface 110 to transmit audio signals of three channels including the mixed woofer channel, the mixed left channel, and the mixed right channel to the reception device. Alternatively, the processor 120 may control the communication interface 110 to transmit audio signals of four channels including the mixed first woofer channel, the mixed second woofer channel, the mixed left channel, and the mixed right channel to the reception device.

For example, the transmission device 100 may be the main body of the sound bar, and the reception device may include a woofer speaker, a rear speaker, etc.

Figure 4:
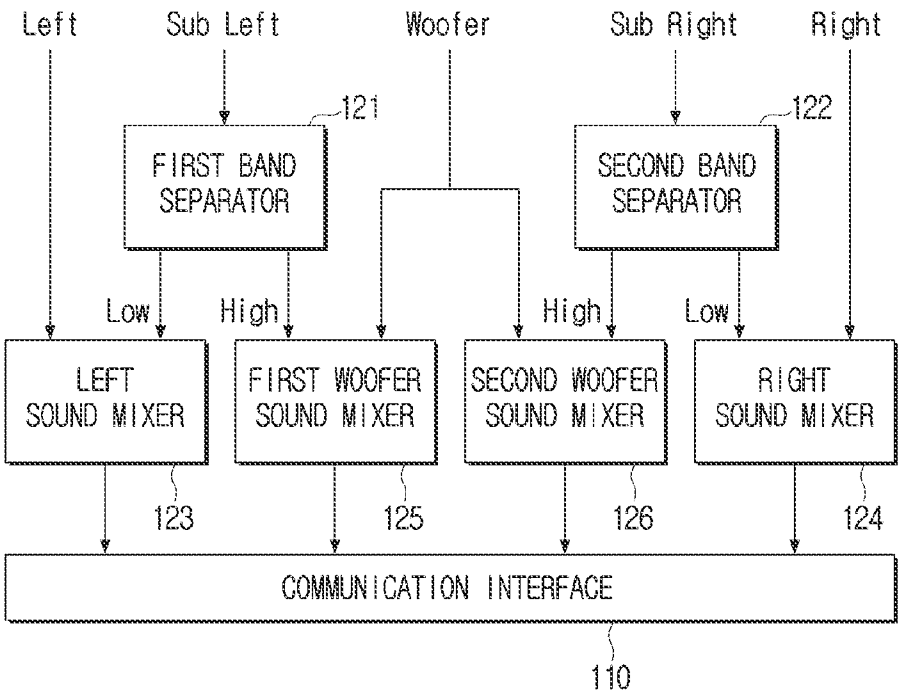
FIG. 4 is a block diagram illustrating an example operation of a transmission device according to various embodiments.

FIG. 4 is a block diagram illustrating an example operation of a transmission device according to various embodiments.

Referring to FIG. 4, a non-limiting down-mixing process for the transmission device 100 to transmit audio signals of five channels to the reception device through a wireless transmission channel having four channels is illustrated.

For example, as illustrated in FIG. 4, an audio signal may include the left channel, the sub-left channel, the right channel, the sub-right channel, and the woofer channel. The processor 120 may include a first band separator 121 that separates an audio signal of the sub-left channel and a second band separator 122 that separates an audio signal of the sub-right channel. The first band separator 121 may separate an audio signal of the sub-left channel into a high-pass audio signal and a low-pass audio signal based on the frequency band of an audio signal of the woofer channel. As an example, the first band separator 121 may separate an audio signal of the sub-left channel into a high-pass audio signal and a low-pass audio signal based on the predetermined frequency higher than the cut-off frequency of the woofer channel. The predetermined frequency may be the stop band boundary frequency. The second band separator 122 may separate an audio signal of the sub-right channel into a high-pass audio signal and a low-pass audio signal by a similar method as the first band separator 121.

The processor 120 may include sound mixers 123, 124, 125, 126 that mix the separated audio signals with the audio signals of the original channels. For example, the left sound mixer 123 may mix a low-pass audio signal of the sub-left channel separated from an audio signal of the left channel. The right sound mixer 124 may mix a low-pass audio signal of the sub-right channel separated from an audio signal of the right channel. The first woofer sound mixer 125 may mix a high-pass audio signal of the sub-left channel separated from an audio signal of the woofer channel. The second woofer sound mixer 126 may mix a high-pass audio signal of the sub-right channel separated from an audio signal of the woofer channel.

Through the aforementioned process, the processor 120 may down-mix audio signals of five channels including the woofer channel to audio signals of four channels for wireless transmission. The processor 120 may control the communication interface 110 to transmit the down-mixed audio signals of four channels to the reception device through a wireless transmission route of four channels.

The reception device may restore the audio signals of four channels received through the wireless transmission route of four channels to audio signals of five channels, and output the audio signals through the speakers corresponding to each channel.

Figure 5:
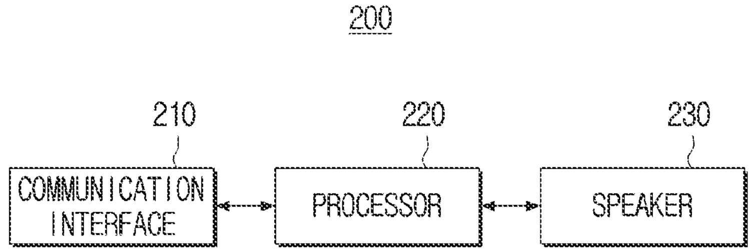
FIG. 5 is a block diagram illustrating an example configuration of a reception device according to various embodiments.

FIG. 5 is a block diagram illustrating an example configuration of a reception device according to various embodiments.

Referring to FIG. 5, the reception device 200 may include a communication interface (e.g., including various circuitry) 210, a processor (e.g., including processing circuitry) 220, and a speaker 230.

The communication interface 210 may include various circuitry and perform communication with an external device. The communication interface 210 may receive audio signals of a plurality of channels from the transmission device. For example, the audio signals may include audio signals of the mixed woofer channel, the mixed left channel, and the mixed right channel. The audio signal of the mixed woofer channel may include a high-pass audio signal of the sub-left channel, a high-pass audio signal of the sub-right channel, and an audio signal of the woofer channel. The audio signal of the mixed left channel may include a low-pass audio signal of the sub-left channel and an audio signal of the left channel. Also, the audio signal of the mixed right channel may include a low-pass audio signal of the sub-right channel and an audio signal of the right channel. Alternatively, the audio signals may include audio signals of the mixed first woofer channel, the mixed second woofer channel, the mixed left channel, and the mixed right channel. The audio signal of the mixed first woofer channel may include a high-pass audio signal of the sub-left channel and an audio signal of the woofer channel. The audio signal of the mixed second woofer channel may include a high-pass audio signal of the sub-right channel and an audio signal of the woofer channel. That is, the processor 220 may control the communication interface 210 to receive audio signals of channels that were down-mixed from audio signals of five channels including the left channel, the sub-left channel, the right channel, the sub-right channel, and the woofer channel from the reception device.

The processor 220 may control each component of the reception device. For example, the processor 220 may control the communication interface 210 to receive audio signals of the plurality of channels from the reception device. The processor 220 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 220 may separate a high-pass audio signal of the sub-left channel, a high-pass audio signal of the sub-right channel, and an audio signal of the woofer channel from an audio signal of the mixed woofer channel. Alternatively, the processor 220 may separate a high-pass audio signal of the sub-left channel and an audio signal of the woofer channel from an audio signal of the mixed first woofer channel, and separate a high-pass audio signal of the sub-right channel and an audio signal of the woofer channel from an audio signal of the mixed second woofer channel. The processor 220 may separate a high-pass audio signal of the sub-left channel, a high-pass audio signal of the sub-right channel, and an audio signal of the woofer channel based on the predetermined frequency higher than the cut-off frequency of the woofer channel, and the predetermined frequency may be the stop band boundary frequency of the woofer channel.

The processor 220 may control the speaker 230 to output the separated audio signal of the woofer channel, the separated high-pass audio signal of the sub-left channel, the audio signal of the mixed left channel, the separated audio signal of the sub-right channel, and the audio signal of the mixed right channel respectively to the corresponding channels of the speaker.

Figure 6:
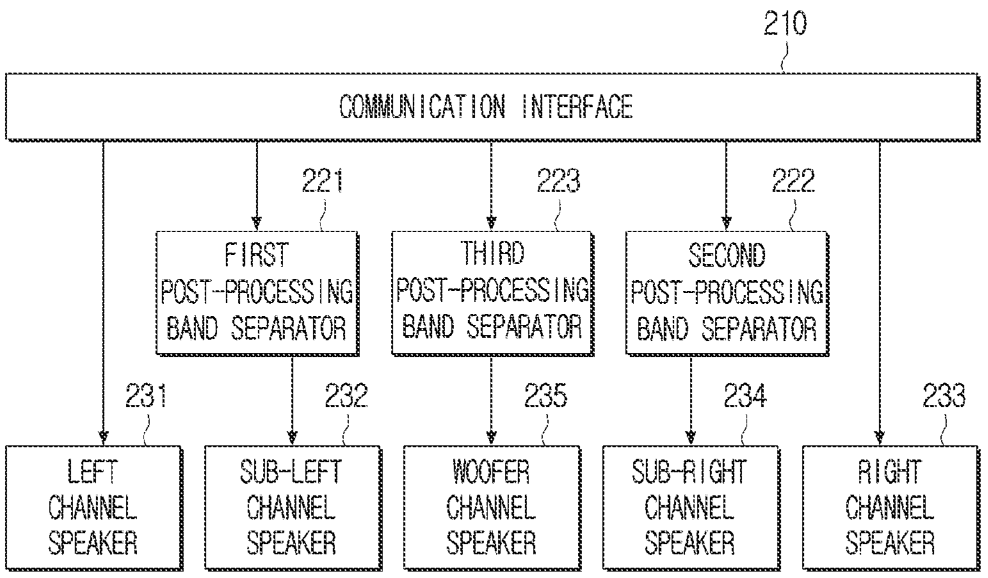
FIG. 6 is a block diagram illustrating an example operation of a reception device according to various embodiments.

FIG. 6 is a block diagram illustrating an example operation of a reception device according to various embodiments.

Referring to FIG. 6, a process wherein the reception device 200 restores down-mixed audio signals that were transmitted through the wireless transmission channel having four channels to audio signals of five channels, and outputs the audio signals through the speaker 230 is illustrated. In FIG. 6, it was illustrated that audio signals of multi-channels are received through one communication interface, for the convenience of explanation, but in case each of the plurality of reception devices 200 is implemented independently, the communication interface in FIG. 6 may refer, for example, to an individual communication interface included in each of the plurality of reception devices 200.

For example, the reception device 200 may receive down-mixed audio signals of four channels from the transmission device through the communication interface 210. For example, the audio signals of four channels may include audio signals of the mixed first woofer channel, the mixed second woofer channel, the mixed left channel, and the mixed right channel.

The processor 220 may include post-processing band separators 221, 222, 223 that separate an audio signal of a channel to be output to the speaker 230 from an audio signal of a mixed channel. The first post-processing band separator 221 may separate a high-pass audio signal of the sub-left channel from an audio signal of the mixed first woofer channel. The second post-processing band separator 222 may separate a high-pass audio signal of the sub-right channel from an audio signal of the mixed second woofer channel. The third post-processing band separator 223 may separate an audio signal of the woofer channel from an audio signal of the mixed first woofer channel and/or an audio signal of the mixed second woofer channel.

As illustrated in FIG. 6, the processor 220 may not perform a separation process for an audio signal of the mixed left channel and an audio signal of the mixed right channel, but output the audio signals respectively through the left channel speaker 231 and the right channel speaker 233. The processor 220 may output a high-pass audio signal of the sub-left channel separated at the first post-processing band separator 221 through the sub-left channel speaker 232, and output a high-pass audio signal of the sub-right channel separated at the second post-processing band separator 222 through the sub-right channel speaker 234. Also, the processor 220 may output an audio signal of the woofer channel separated at the third post-processing band separator 223 through the woofer channel speaker 235.

Through the aforementioned process, the transmission device 100 may down-mix audio signals of the plurality of channels, and transmit the audio signals to the reception device 200, and the reception device 200 may restore the audio signals of the plurality of channels from the received audio signals, and output the audio signals of each channel through the corresponding speakers 230.

Meanwhile, the transmission device 100 and the reception device 200 may further include various components other than the aforementioned components.

Figure 7:
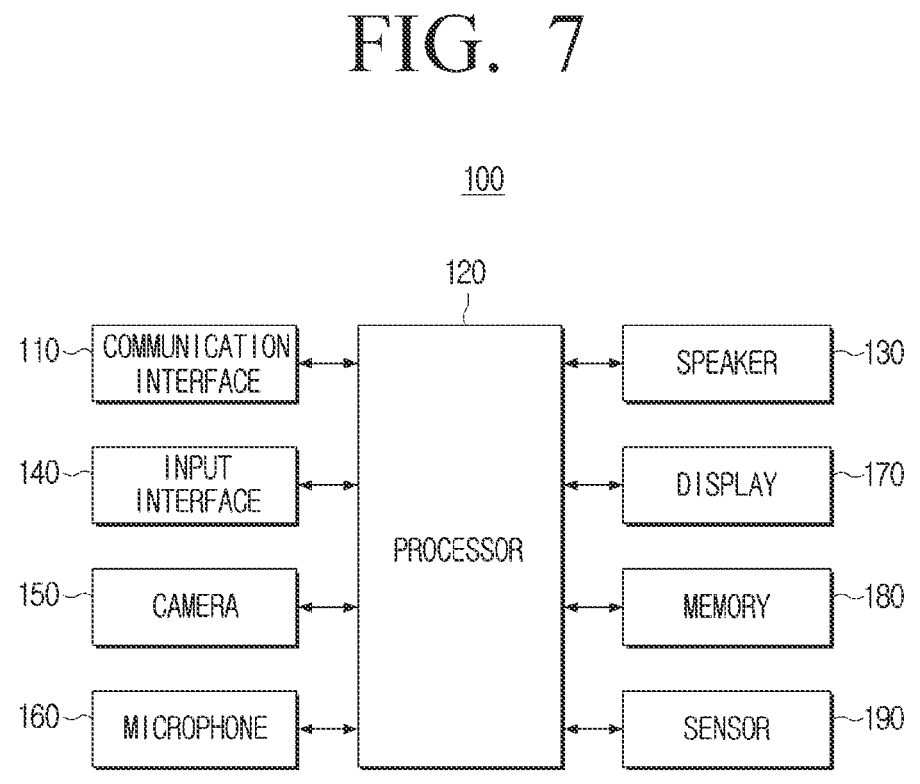

FIG. 7 is a block diagram illustrating an example configuration of a transmission device according to various embodiments.

Referring to FIG. 7, the transmission device 100 may further include a communication interface (e.g., including various circuitry) 110, a processor (e.g., including processing circuitry) 120, a speaker 130, an input interface (e.g., including input circuitry) 140, a camera 150, a microphone 160, a display 170, a memory 180, and a sensor 190. As the communication interface 110 is the same as or similar to what was described above, detailed explanation may not be repeated here.

The speaker 130 may output a processed audio signal. For example, the speaker 130 may output a notification regarding an operation or a state of the transmission device 100 as an audio signal. Alternatively, the transmission device 100 may include a front channel speaker and a woofer channel speaker. In this case, the speaker 130 may output an audio signal of a corresponding channel.

The input interface 140 may include various input circuitry and receive an input of a control command from the user. For example, the input interface 140 may be implemented as a key pad, a touch pad, etc. The input interface 140 may perform a function of receiving an input of a command from the user, and it may also be referred to as an input device, an inputter, an input module, etc.

The camera 150 may photograph the surrounding environment including the user. The processor 120 may identify an object based on the photographed image. Alternatively, the processor 120 may identify an operation or a location of the user based on the photographed image.

The microphone 160 may receive an input of an audio signal. The input audio signal may be processed by the processor 120, and may be output through the speaker 130, or may be transmitted to an external device through the communication interface 110.

The memory 180 may store data and an algorithm, etc. for performing the functions of the transmission device 100, and store programs, instructions, etc. driven at the transmission device 100. For example, the memory 180 may be implemented as types such as a ROM, a RAM, an HDD, an SSD, a memory card, etc.

The sensor 190 may detect the environment, an object, or the user around the transmission device 100. For example, the sensor 190 may include an image sensor, a motion recognition sensor, a proximity sensor, a heat detection sensor, a touch sensor, an infrared sensor, an ultrasonic sensor, a geomagnetic sensor, etc.

The components of the transmission device 100 have bee explained. The transmission device 100 may include all or some of the aforementioned components, and further include necessary components other than the aforementioned components. The reception device 200 may include all or some of components that are identical or similar to each component of the transmission device 100 described in FIG. 7.

From below, a transmission process that minimizes and/or reduces deformation or loss of down-mixed audio signals will be described in greater detail.

Figure 8:
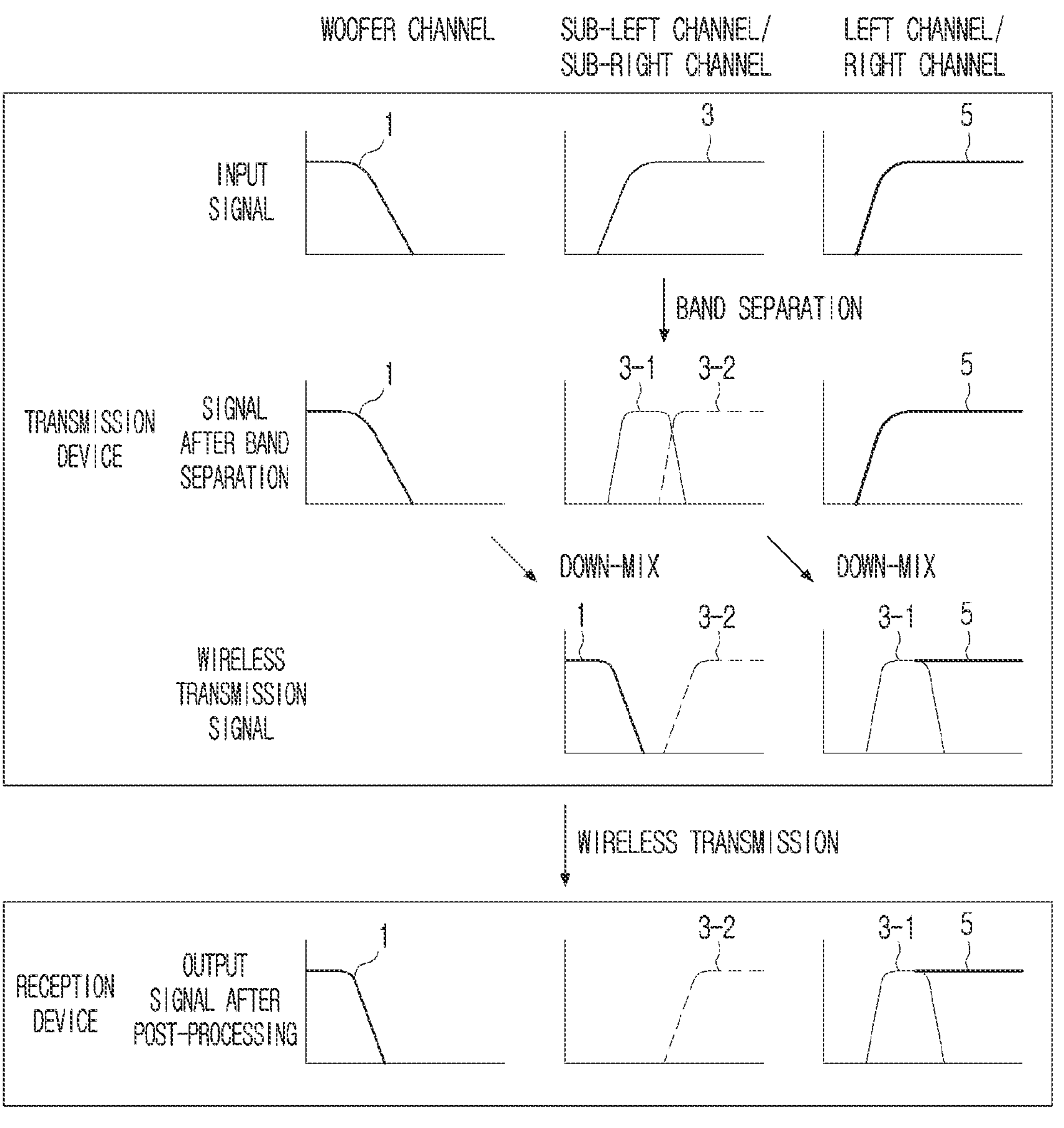
FIG. 8 is a diagram illustrating an example process of transmitting multi-channel audio signals according to various embodiments.

FIG. 8 is a diagram illustrating an example process of transmitting multi-channel audio signals according to various embodiments.

Referring to FIG. 8, an audio signal may include a woofer channel 1, a sub-left channel/a sub-right channel 3, and a left channel/a right channel 5. The sub-left channel/the sub-right channel 3 may be audio signals of the same form, and there are only differences in the time, the phase, etc. according to a location of a sound source, and the left channel/the right channel 5 may also be audio signals of the same form.

For example, as illustrated in FIG. 8, audio signals of the woofer channel 1 may exist in a frequency band lower than a specific frequency. Meanwhile, audio signals of the sub-left channel/the sub-right channel 3 and the left channel/the right channel 5 may be distributed in an overall frequency band, but may be distributed in a large number in a frequency band higher than a specific frequency.

The transmission device 100 may separate sound signals of the sub-left channel/the sub-right channel 3 into sound signals 3-1 of a low frequency band and sound signals 3-2 of a high frequency band. The transmission device 100 may separate the sub-left channel/the sub-right channel 3 based on a frequency band of the woofer channel 1. For example, the transmission device 100 may separate audio signals of the sub-left channel/the sub-right channel 3 based on the predetermined frequency such as the stop band boundary frequency of the woofer channel 1.

The transmission device 100 may mix the separated sound signals 3-2 of the high frequency band of the sub-left channel/the sub-right channel 3 with the sound signals of the woofer channel 1, and mix the sound signals 3-1 of the low frequency band of the sub-left channel/the sub-right channel 3 respectively with the sound signals of the left channel/the right channel 5.

The transmission device 100 may transmit the mixed sound signals to the reception device 200. For example, in case the transmission device 100 mixed all of the sound signals 3-2 of the high frequency band of the sub-left channel/the sub-right channel 3 with one sound signal of the woofer channel 1, the transmission device 100 may transmit the sound signals of the three channels of the mixed woofer channel, the mixed left channel, and the mixed right channel to the reception device. In case the transmission device 100 mixed the sound signals 3-2 of the high frequency band of the sub-left channel/the sub-right channel 3 respectively with the sound signals of the woofer channel 1, the transmission device 100 may transmit the sound signals of the four channels of the mixed first woofer channel, the mixed second woofer channel, the mixed left channel, and the mixed right channel to the reception device.

The reception device 200 may receive the sound signals of the plurality of mixed channels. The reception device 200 may separate the sound signals 3-2 of the high frequency band of the sub-left channel/the sub-right channel and the sound signals of the woofer channel 1 from the mixed woofer channel. Alternatively, the reception device 200 may separate the sound signals 3-2 of the high frequency band of the sub-left channel/the sub-right channel from each of the mixed first and second woofer channels. Then, the reception device 100 may separate the sound signals of the woofer channel 1 from at least one of the mixed first or second woofer channels. As illustrated in FIG. 8, the transmission device 100 separated the sound signals 3-2 of the high frequency band of the sub-left channel/the sub-right channel based on a frequency that almost does not overlap with the sound signals of the woofer channel 1, and thus the reception device 200 may separate the sound signals of the woofer channel 1 and the sound signals 3-2 of the high frequency band of the sub-left channel/the sub-right channel with little loss.

The separated sound signals of the woofer channel 1 may be output through the woofer speaker. Also, the separated sound signals 3-2 of the high frequency band of the sub-left channel/the sub-right channel may respectively be output through the sub-left speaker (e.g., the rear top left speaker) and the sub-right speaker (e.g., the rear top right speaker).

The sound signals of the left channel/the right channel 5 wherein the sound signals 3-1 of the low frequency band of the sub-left channel/the sub-right channel are mixed may respectively be output through the left speaker and the right speaker. As the sound signals of the sub-left channel/the sub-right channel are auxiliary signals for the sound signals of the left channel/the right channel 5, even if the sound signals 3-1 of the low frequency band of the sub-left channel/the sub-right channel are respectively output together with the sound signals of the left channel/the right channel 5, the listener may feel little difference. Accordingly, the audio system according to the disclosure may transmit audio signals by minimizing and/or reducing loss of sound signals through a wireless transmission route having channels of a fewer number than the number of channels of the audio signals.

So far, various embodiments of the disclosure have been described. From below, a control method of a transmission device and a reception device will be described in greater detail.

Figure 9:
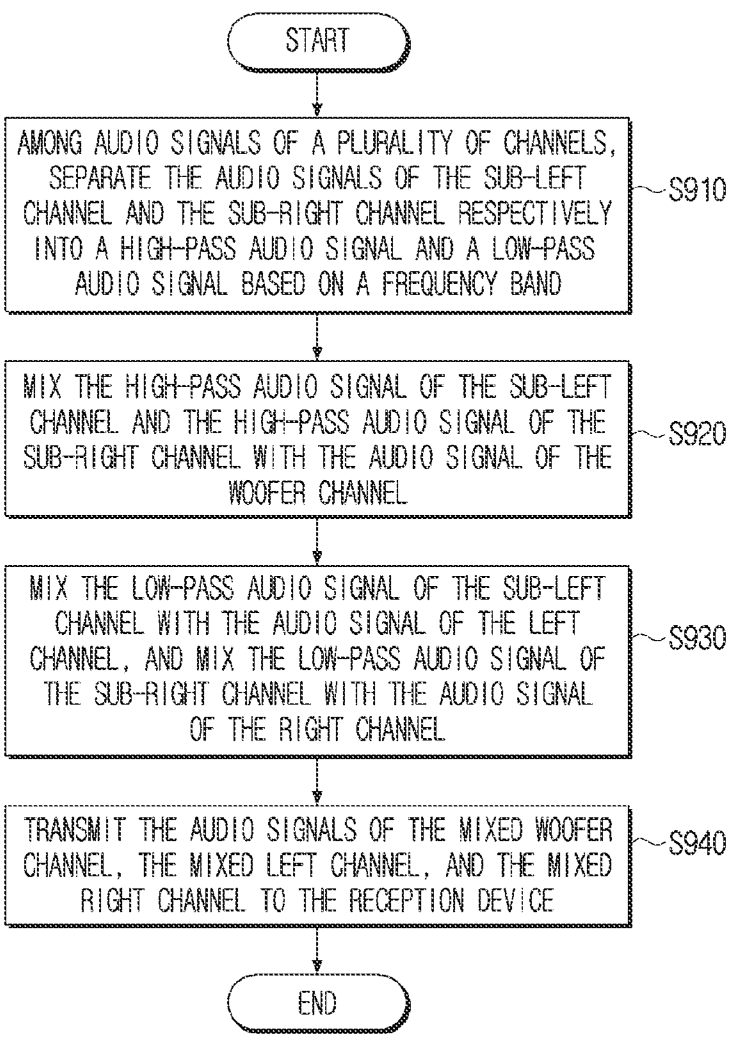
FIG. 9 is a flowchart illustrating an example method of operating a transmission device according to various embodiments.

FIG. 9 is a flowchart illustrating an example method of controlling a transmission device according to various embodiments.

Referring to FIG. 9, the transmission device separates audio signals of the sub-left channel and the sub-right channel respectively into a high-pass audio signal and a low-pass audio signal based on a frequency band in operation S910. For example, the audio signals of the plurality of channels may include the left channel, the sub-left channel, the right channel, the sub-right channel, and the woofer channel. As an example, the transmission device may separate the audio signals of the sub-left channel and the sub-right channel based on a predetermined frequency higher than a cut-off frequency of the woofer channel. For example, the predetermined frequency may be a stop band boundary frequency of the woofer channel.

The transmission device mixes the high-pass audio signal of the sub-left channel and the high-pass audio signal of the sub-right channel with the audio signal of the woofer channel in operation S920. In case the transmission device transmits audio signals through a wireless transmission route of four channels, the transmission device may generate an audio signal of a first woofer channel wherein the high-pass audio signals of the woofer channel and the sub-left channel are mixed, and generate an audio signal of a second woofer channel wherein the high-pass audio signals of the woofer channel and the sub-right channel are mixed. That is, the transmission device may generate audio signals of four channels including the mixed first woofer channel, the mixed second woofer channel, the mixed left channel, and the mixed right channel that were down-mixed from the audio signals of five channels including the left channel, the sub-left channel, the right channel, the sub-right channel, and the woofer channel.

The transmission device mixes the low-pass audio signal of the sub-left channel with the audio signal of the left channel, and mixes the low-pass audio signal of the sub-right channel with the audio signal of the right channel in operation S930. The transmission device transmits the audio signals of the mixed woofer channel, the mixed left channel, and the mixed right channel to the reception device in operation S940.

Figure 10:
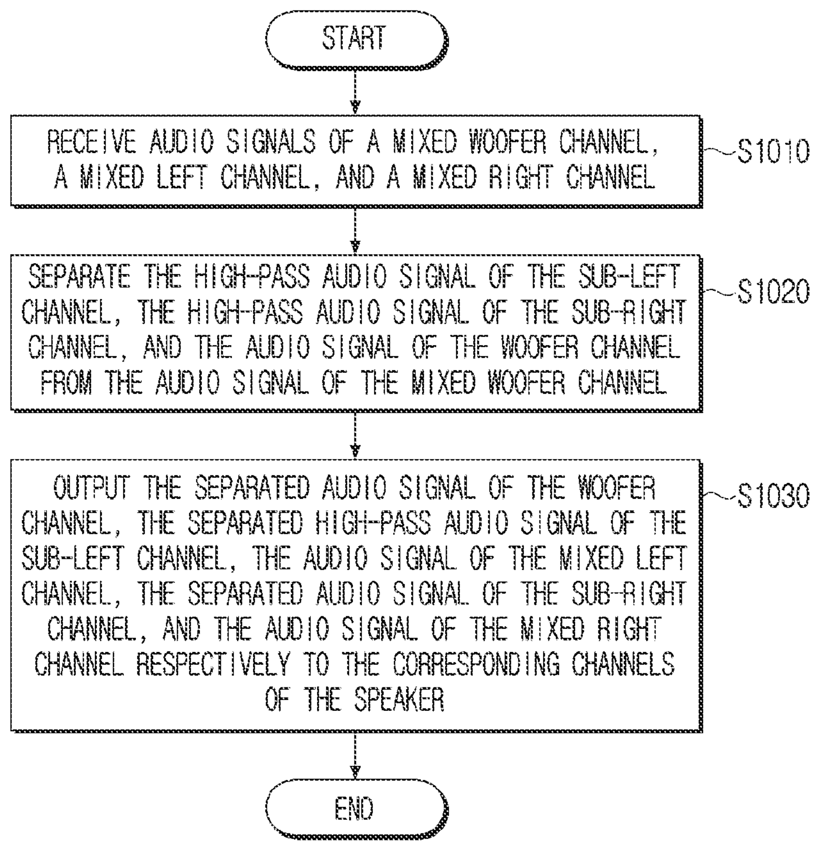
FIG. 10 is a flowchart illustrating an example method of controlling a reception device according to various embodiments.

FIG. 10 is a flowchart illustrating an example method of controlling a reception device according to various embodiments.

Referring to FIG. 10, the reception device may include a speaker outputting audio signals of a plurality of channels. The reception device receives audio signals of the mixed woofer channel, the mixed left channel, and the mixed right channel in operation S1010. For example, the audio signal of the mixed woofer channel may include a high-pass audio signal of the sub-left channel, a high-pass audio signal of the sub-right channel, and an audio signal of the woofer channel. The audio signal of the mixed-left channel may include a low-pass audio signal of the sub-left channel and an audio signal of the left channel. Also, the audio signal of the mixed-right channel may include a low-pass audio signal of the sub-right channel and an audio signal of the right channel.

As an example, in case the reception device receives audio signals through a wireless transmission route of four channels, the audio signal of the mixed woofer channel may include an audio signal of the first woofer channel wherein the high-pass audio signals of the woofer channel and the sub-left channel are mixed, and an audio signal of the second woofer channel wherein the high-pass audio signals of the woofer channel and the sub-right channel are mixed.

The reception device separates the high-pass audio signal of the sub-left channel, the high-pass audio signal of the sub-right channel, and the audio signal of the woofer channel from the audio signal of the mixed woofer channel in operation S1020. For example, the reception device may separate the high-pass audio signal of the sub-left channel, the high-pass audio signal of the sub-right channel, and the audio signal of the woofer channel based on a predetermined frequency higher than a cut-off frequency of the woofer channel. As an example, the predetermined frequency may be a stop band boundary frequency of the woofer channel.

The reception device outputs the separated audio signal of the woofer channel, the separated high-pass audio signal of the sub-left channel, the audio signal of the mixed left channel, the separated audio signal of the sub-right channel, and the audio signal of the mixed right channel respectively to the corresponding channels of the speaker in operation S1030.

The control method of a transmission device or a reception device according to the aforementioned various embodiments may also be provided as a computer program product. The computer program product may include an S/W program itself or a non-transitory computer readable medium having an S/W program stored therein.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disc, a blue-ray disc, a USB, a memory card, a ROM, and the like.

While the disclosure has been illustrated and described with reference to various example embodiments, the disclosure is not limited to the aforementioned various example embodiments, and it will be apparent to those skilled in the art that various modifications may be made, without departing from the true spirit and full scope of the disclosure, including the appended claims and their equivalents. It will also be understood that any of the embodiment(s) described herein may be used in conjunction with any other embodiment(s) described herein.

What is claimed is:

1. A transmission device comprising:

a communication interface comprising circuitry; and at least one processor, comprising processing circuitry, individually and/or collectively, is configured to:

among audio signals of a plurality of channels including a left channel, a sub-left channel, a right channel, a sub-right channel, and a woofer channel, separate the audio signals of the sub-left channel and the sub-right channel respectively into a high-pass audio signal and a low-pass audio signal based on a frequency band, mix the high-pass audio signal of the sub-left channel and the high-pass audio signal of the sub-right channel with the audio signal of the woofer channel to provide respective mixed woofer channels, mix the low-pass audio signal of the sub-left channel with the audio signal of the left channel, and mix the low-pass audio signal of the sub-right channel with the audio signal of the right channel, and control the communication interface to transmit the audio signals of the mixed woofer channels, the mixed left channel, and the mixed right channel to a reception device.

2. The transmission device of claim 1, wherein the processor is configured to:

generate, in providing the mixed woofer channels, an audio signal of a first mixed woofer channel based on signals of the woofer channel and high-pass audio signals of the sub-left channel being mixed, and generate an audio signal of a second mixed woofer channel based on signals of the woofer channel and high-pass audio signals of the sub-right channel being mixed.

3. The transmission device of claim 2, wherein the processor is configured to:

control the communication interface to transmit the audio signals of four channels including the first mixed woofer channel, the second mixed woofer channel, a mixed left channel resulting from the mix of the low-pass audio signal of the sub-left channel with the audio signal of the left channel, and a mixed right channel resulting from the mix of the low-pass audio signal of the sub-right channel with the audio signal of the right channel, from the audio signals of five channels including the left channel, the sub-left channel, the right channel, the sub-right channel, and the woofer channel, to the reception device.

4. The transmission device of claim 1, wherein at least one processor, individually and/or collectively, is configured to:

separate the audio signals of the sub-left channel and the sub-right channel based on a specified frequency higher than a cut-off frequency of the woofer channel.

5. The transmission device of claim 4, wherein the specified frequency is a stop band boundary frequency of the woofer channel.

6. A method of controlling a transmission device, the method comprising:

among audio signals of a plurality of channels including a left channel, a sub-left channel, a right channel, a sub-right channel, and a woofer channel, separating the audio signals of the sub-left channel and the sub-right channel respectively into a high-pass audio signal and a low-pass audio signal based on a frequency band;

mixing the high-pass audio signal of the sub-left channel and the high-pass audio signal of the sub-right channel with the audio signal of the woofer channel to provide respective mixed woofer channels;

mixing the low-pass audio signal of the sub-left channel with the audio signal of the left channel, and mixing the low-pass audio signal of the sub-right channel with the audio signal of the right channel; and transmitting the audio signals of the mixed woofer channels, the mixed left channel, and the mixed right channel to a reception device.

7. The method of claim 6, wherein the mixing to provide the mixed woofer channels comprises:

generating an audio signal of a first mixed woofer channel based on signals of the woofer channel and high-pass audio signals of the sub-left channel being mixed, and generate an audio signal of a second mixed woofer channel based on signals of the woofer channel and high-pass audio signals of the sub-right channel being mixed.

8. The method of claim 7, wherein the transmitting to the reception device comprises:

transmitting the audio signals of four channels including the first mixed woofer channel, the second mixed woofer channel, a mixed left channel resulting from the mix of the low-pass audio signal of the sub-left channel with the audio signal of the left channel, and a mixed right channel resulting from the mix of the low-pass audio signal of the sub-right channel with the audio signal of the right channel, from the audio signals of five channels including the left channel, the sub-left channel, the right channel, the sub-right channel, and the woofer channel, to the reception device.

9. The method of claim 6, wherein the separating comprises:

separating the audio signals of the sub-left channel and the sub-right channel based on a specified frequency higher than a cut-off frequency of the woofer channel.

10. The method of claim 9, wherein the specified frequency is a stop band boundary frequency of the woofer channel.

* * * * *